US011706729B2

(12) United States Patent
Alsina et al.

(10) Patent No.: US 11,706,729 B2
(45) Date of Patent: *Jul. 18, 2023

(54) SYNCHRONIZED PLAYBACK AND CONTROL OF MEDIA

(71) Applicant: Apple Inc., Cupertino, CA (US)

(72) Inventors: Thomas Alsina, Mountain View, CA (US); Taylor G. Carrigan, San Francisco, CA (US); Szu-Wen Huang, Union City, CA (US); Eric S. Lee, Mountain View, CA (US); William M. Bachman, San Jose, CA (US); Jeffrey L. Robbin, Los Altos, CA (US); Steve S. Gedikian, Redwood City, CA (US); Nicholas J. Paulson, San Francisco, CA (US); Gregory R. Chapman, San Jose, CA (US); David P. Saracino, San Francisco, CA (US); Steven P. Bischoff, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/707,576

(22) Filed: Mar. 29, 2022

(65) Prior Publication Data

US 2022/0295436 A1 Sep. 15, 2022

Related U.S. Application Data

(60) Continuation of application No. 16/449,988, filed on Jun. 24, 2019, now Pat. No. 11,304,160, which is a
(Continued)

(51) Int. Cl.
*H04W 56/00* (2009.01)
*H04L 67/104* (2022.01)
(Continued)

(52) U.S. Cl.
CPC ........ *H04W 56/0015* (2013.01); *G06F 3/165* (2013.01); *H04L 65/60* (2013.01);
(Continued)

(58) Field of Classification Search
None
See application file for complete search history.

(56) References Cited

U.S. PATENT DOCUMENTS

| 8,364,296 B2 | 1/2013 | Wilhelm |
| 11,304,160 B2 * | 4/2022 | Alsina ................ H04N 21/4307 |

(Continued)

FOREIGN PATENT DOCUMENTS

| CN | 102668424 A | 9/2012 |
| CN | 104052562 A | 9/2014 |
| CN | 104798344 A | 7/2015 |

OTHER PUBLICATIONS

Seedio by supertask, Seedio on the App Store on iTunes, updated Oct. 15, 2014, Copyright .Copyrgt. 2014 Apple Inc. All rights reserved, retrieved Jun. 25, 2015 from https://itunes.apple.com/us/app/seedio/id546283234?mt=8.
(Continued)

*Primary Examiner* — Mohammad S Adhami
(74) *Attorney, Agent, or Firm* — BakerHostetler

(57) ABSTRACT

Methods and systems provide synchronized sharing of multimedia between multiple devices. The multiple devices may form an ad-hoc network for sharing of multimedia. In an embodiment, group members may have playlist manipulation privileges such as pausing, rewinding, fast forwarding, or adding tracks to the playlist. A system may stream or distribute content according to the shared playlist. Playback may be synchronized for group members so that everyone is exposed to a same part of the content as the same time.

23 Claims, 4 Drawing Sheets

Related U.S. Application Data division of application No. 15/425,068, filed on Feb. 6, 2017, now abandoned, which is a continuation of application No. 14/871,839, filed on Sep. 30, 2015, now abandoned.

(51) Int. Cl.

| | | |
|---|---|---|
| *G06F 3/16* | (2006.01) | |
| *H04N 21/4363* | (2011.01) | |
| *H04N 21/439* | (2011.01) | |
| *H04N 21/4788* | (2011.01) | |
| *H04N 21/482* | (2011.01) | |
| *H04N 21/43* | (2011.01) | |
| *H04L 65/60* | (2022.01) | |
| *H04W 4/08* | (2009.01) | |
| *H04W 84/18* | (2009.01) | |

(52) U.S. Cl.
CPC ....... *H04L 67/104* (2013.01); *H04N 21/4307* (2013.01); *H04N 21/439* (2013.01); *H04N 21/43076* (2020.08); *H04N 21/43637* (2013.01); *H04N 21/4788* (2013.01); *H04N 21/4825* (2013.01); *H04W 4/08* (2013.01); *H04W 84/18* (2013.01)

(56) References Cited

U.S. PATENT DOCUMENTS

| | | |
|---|---|---|
| 2005/0286546 A1 | 12/2005 | Bassoli et al. |
| 2006/0002681 A1 | 1/2006 | Spilo et al. |
| 2007/0271338 A1 | 11/2007 | Anschutz |
| 2009/0259711 A1 | 10/2009 | Drieu et al. |
| 2013/0159858 A1 | 6/2013 | Joffray et al. |
| 2014/0067950 A1 | 3/2014 | Winograd |
| 2014/0074924 A1 | 3/2014 | Yim et al. |
| 2015/0094834 A1 | 4/2015 | Vega et al. |
| 2015/0095512 A1 | 4/2015 | Ali et al. |
| 2015/0215715 A1 | 7/2015 | Sheen |
| 2017/0055235 A1 | 2/2017 | Rabii et al. |

OTHER PUBLICATIONS

TuneMob, "TuneMob Play Music in Sync on Multiple Devices via Bluetooth and WiFi Tune Mob Simple Sharing," updated Oct. 11, 2014, retrieved Jun. 25, 2015 from https://itunes.apple.com/us/app/tunemob-play-music-in-sync/id680664826?mt=8.

International Patent Application No. PCT/US2016/049446; Int'l Search Report and the Written Opinion; dated Nov. 7, 2016; 12 pages.

International Patent Application No. PCT/US2016/049446; Int'l Preliminary Report on Patentability; dated Apr. 12, 2018; 7 pages.

\* cited by examiner

100

200

400 ns application is a Continuation of U.S. application Ser. No. 16/449,988, filed Jun. 24, 2019, which is a Divisional of U.S. application Ser. No. 15/425,068, filed on Feb. 6, 2017, which is a Continuation of U.S. application Ser. No. 14/871,839, filed on Sep. 30, 2015, which was filed concurrently with U.S. application Ser. No. 14/871,842, filed on Sep. 30, 2015, entitled "Music Everywhere," U.S. patent applications application Ser. No. 14/871,879, filed on Sep. 30, 2015, entitled "Synchronization of Media Rendering in Heterogeneous Networking Environments," U.S. Application No. 62/235,407, filed on Sep. 30, 2015, entitled "Clock Synchronization Techniques Including Modification of Sample Rate Conversion," and U.S. application Ser. No. 14/871,989 filed on Sep. 30, 2015, entitled "Shared Content Presentation with Integrated Messaging", the entireties of each of which is incorporated herein by reference in its entirety.

SYNCHRONIZED PLAYBACK AND CONTROL OF MEDIA

CROSS-REFERENCE TO RELATED APPLICATIONS

This application is a Continuation of U.S. application Ser. No. 16/449,988, filed Jun. 24, 2019, which is a Divisional of U.S. application Ser. No. 15/425,068, filed on Feb. 6, 2017, which is a Continuation of U.S. application Ser. No. 14/871,839, filed on Sep. 30, 2015, which was filed concurrently with U.S. application Ser. No. 14/871,842, filed on Sep. 30, 2015, entitled "Music Everywhere," U.S. patent applications application Ser. No. 14/871,879, filed on Sep. 30, 2015, entitled "Synchronization of Media Rendering in Heterogeneous Networking Environments," U.S. Application No. 62/235,407, filed on Sep. 30, 2015, entitled "Clock Synchronization Techniques Including Modification of Sample Rate Conversion," and U.S. application Ser. No. 14/871,989 filed on Sep. 30, 2015, entitled "Shared Content Presentation with Integrated Messaging", the entireties of each of which is incorporated herein by reference in its entirety.

BACKGROUND

The present disclosure relates to multimedia processing and sharing. More specifically, it relates to methods and systems for synchronized playback and control of a multimedia stream.

Developments in the Internet and mobile networks have changed the way that people share music. Social media uses the Internet and other telecommunications networks as platforms for sharing, modifying, and commenting on media, sometimes with other members of a social network. Some groups of people may be in close proximity to each other, effectively forming an ad hoc wireless network. Other groups of people may be dispersed in various time zones and geographical locations. In either case, sometimes people wish to share a multimedia stream such as a video or audio. In particular, group members may wish to enjoy a synchronized multimedia stream together so that each member is exposed to a same portion of the multimedia stream at the same time and has an ability to influence what other members hear. For instance, a group of individuals each listening to music via their headphones in a public place may want to synchronize their playlist so that they all experience the playlist simultaneously. Or a group of people may wish to share a playlist across multiple vehicles while on a road trip. Participants may wish to queue songs for playback, pause, fast forward, rewind, and the like. As another example, a musician may want to broadcast a virtual concert to an Internet fan-base.

Existing techniques for providing synchronized playback include radio broadcasting, silent discos, mobile clubbing, and headphone concerts. However, typical methods for synchronous multimedia playback do not give participants (other than a broadcaster) an ability to easily control playback of the multimedia stream for all listeners. That is, participants are typically passive, receiving a broadcast or multicast music stream without an ability to interact with the music and push commands to other participants in real time. For example, music playback in radio is typically controlled by a disc jockey. A radio listener must call a station to request a song for broadcast. While it is possible to pause music on a local device such as a radio receiver, it is not possible for a particular radio listener to pause music for all listeners.

It is also difficult to synchronize streaming media due to the various channels between a media source and a receiver. For instance, delays may be introduced at each hop of a packet-switched network. Additional delays may be due to operating systems, software processing at receivers, and the like. Thus, the inventors perceived a need in the art for synchronizing and controlling playback of a multimedia stream for several participants.

DETAILED DESCRIPTION

Figure 1:
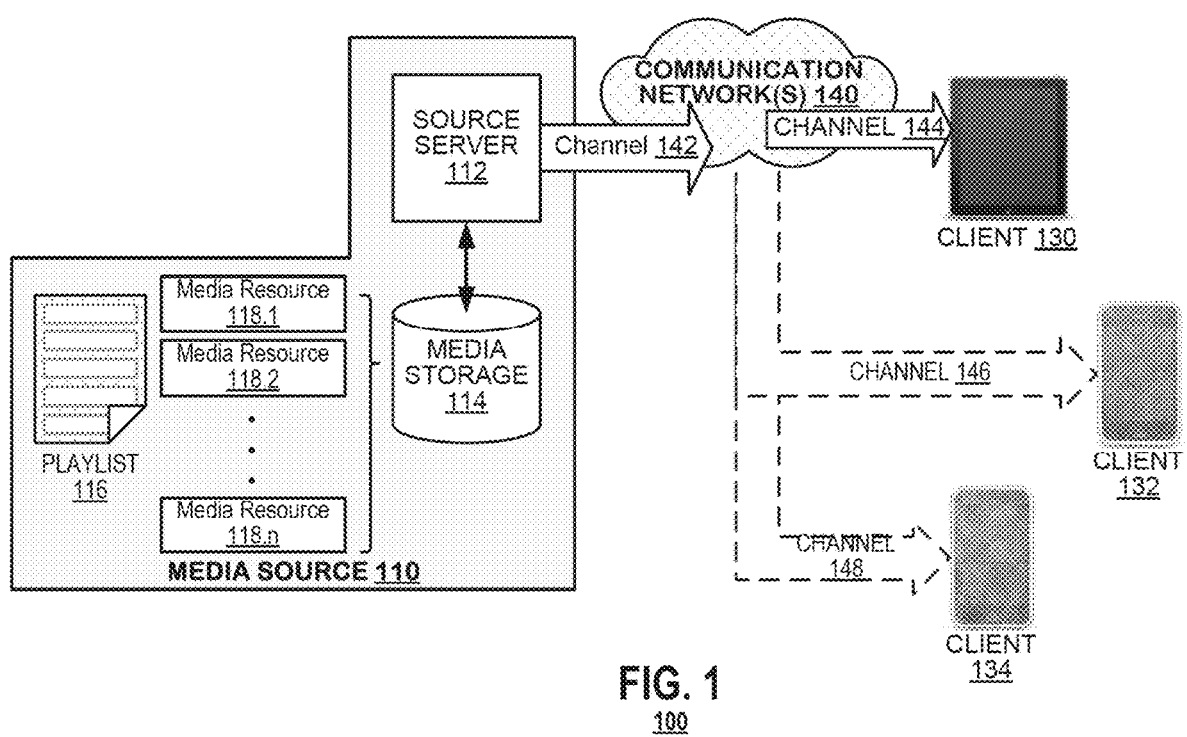
FIG. 1 is a simplified functional block diagram of an exemplary system according to an embodiment of the present disclosure.

Systems and methods are provided for synchronizing a digital media stream for member devices of a group, for example, by maintaining a member list of the member devices of the group the member list stored at least at a master device for the group, maintaining a playlist including at least one track for distribution to the member devices, the playlist distributed to each member of the group, receiving at the master device commands to manipulate the playlist from one of the member devices, updating a copy of the playlist based on a received command, and distributing the updated playlist to each of the member devices such that the received command is performed substantially simultaneously at each member device. The group devices may form an ad-hoc, peer-to-peer network for distribution of playlist and associated media files. The received commands may include pausing, fast forwarding, rewinding, skipping, or adding a track to the playlist or other actions that can be performed on a track or playlist.

To effectively synchronize playback, the clocks of the member devices may be synchronized, for example, by determining an accuracy of a respective clock of each of the member devices, comparing the accuracy of each of the clocks to determine a most accurate clock, setting the most accurate clock as a master clock, and adjusting playback of a track to be consistent with the master clock for each member device other than the member device associated with the master clock. Further synchronization may be achieved by scheduling an anchor time as a track relative time to begin or restart playback of a track from the playlist and distributing the anchor time to each of the member devices, such that each member device is capable of adjusting the playback time to begin playback at the anchor time substantially simultaneously. Each member device may buffer track data until the synchronized time to begin playback. The buffer time may be consistent with the slower device in the group.

New members may join the group by sending a join request to or accepting a join invitation from a current group member. The join request may be received at a master device such that the master device can update the member list to include the invitee device and distribute a copy of the playlist and at least a portion of a current or next track to the invitee device. The invitee device may additionally be authenticated to identify the permissions, restrictions, and/or capabilities of the invitee device. The permissions of the members may be identified to determine if one or more group members are restricted from playing a certain type of track. If a device is restricted from playing a type of track, either the device is removed (possibly temporarily) from the group, skipping distribution of the track to the restricted device, or removing the track from the playlist. If a playlist contains a certain type of track and a new invitee seeking to join the group is restricted from playing that type of track, the invitee's membership request may be denied.

If a track in the playlist is protected by a digital rights management scheme, it may be determined whether at least one of the members devices contains digital rights to the track, and if none of the group members owns digital rights to the track, the track may be removed from the playlist.

Certain commands, such as skipping, may be associated with a specific track such that if multiple member devices press the skip command during the same song, only the current song will be skipped.

The owner of the master device may be presented with a graphical user interface to resolve a conflict between a plurality of received commands. If the master device departs the group, another one of the member devices may be appointed as the master device.

FIG. 1 is a simplified functional block diagram of an exemplary system 100 according to an example embodiment. As shown in FIG. 1, the system may include a media source 110 and one or more client devices 130, 132, and 134 interconnected via a communication network 140 to form a group. For example, the client devices 130, 132, and 134 may have formed a group and synchronize payback of a playlist by retrieving or streaming media resources and assets from a network accessible storage.

The media source 110 may include a source server 112 that distributes the media resources to the client devices of the group 130, 132, 134. As part of the media source, a storage system 114 may store a copy of the playlist 116 for multiple media resources, such as an audio file or a movie file, and the available media resources 118.1-118.n. According to an embodiment, the media resources stored in the storage system 114 may be encoded according to any known coding protocol, for example H.264 or HEVC, for transmission to the client devices 130, 132, 134.

The client device(s) 130 represent media players that download coded multimedia data from the media source 110, decode the coded multimedia resources and render them for playback. The playback of the received media resources may be synchronized as described herein.

A group list of each of the client devices within the group may be maintained by at least one of the client devices. According to an embodiment, each of the client devices within the group also may store and maintain a group list. The group list may include an identification and/or address of each device in the group. According to an embodiment, the group list may additionally include information relating to the resources and restrictions of each client device. For example, the additional information may identify the limitations of the decoder at the client, the bandwidth the device is capable of receiving, or any content restrictions associated with the client device.

A group may be created in a variety of ways. For example, information about other devices may be obtained through a scanning and discovery process. Then a client device may identify and enumerate the groups or other client devices with which the client device may join or otherwise have access to. For example, the client device may look for known contacts in the vicinity. Alternatively, a group member may send an invitation to one or more client devices inviting new members to the group. When two devices are connected, they may form a group. In each group, one of the devices will be deemed the master device and a group list will be created. Each subsequent member added to the group will be added to the group list.

In another example, a group list may be initially generated upon group creation and then adjusted as the group membership changes. For example, a group list may be initially generated when two wireless devices form a group, and entries may be added or removed when a device joins or leaves the group. In this example, the initiating wireless device and any associated information may be listed first, and each subsequent device may be listed thereafter in the order that it joins the group or in some other hierarchy. In addition, the group list may be updated when the communication requirements of one of the group devices changes.

The master device may create and maintain the group list as well as create, distribute, and maintain a group playlist. The playlist will include identifiers for one or more media resources for synchronized playback among the group.

According to an embodiment, a master playlist 116 may be stored at a media source 110 and may identify segments or tracks of multimedia files that are stored by a server 112 of the media source 110. In an embodiment, the master playlist 116 may define an order in which multimedia files are distributed to the one or more client devices 130, 132, and 134. The media source 110 may transmit the media resources 118.1-118.n to devices in the group and on the communication network 140 via a channel 142. In an embodiment (not shown), the media source 110 may be played on one or more client devices, e.g., the one or more client devices 130, 132, and 134.

Figure 2:
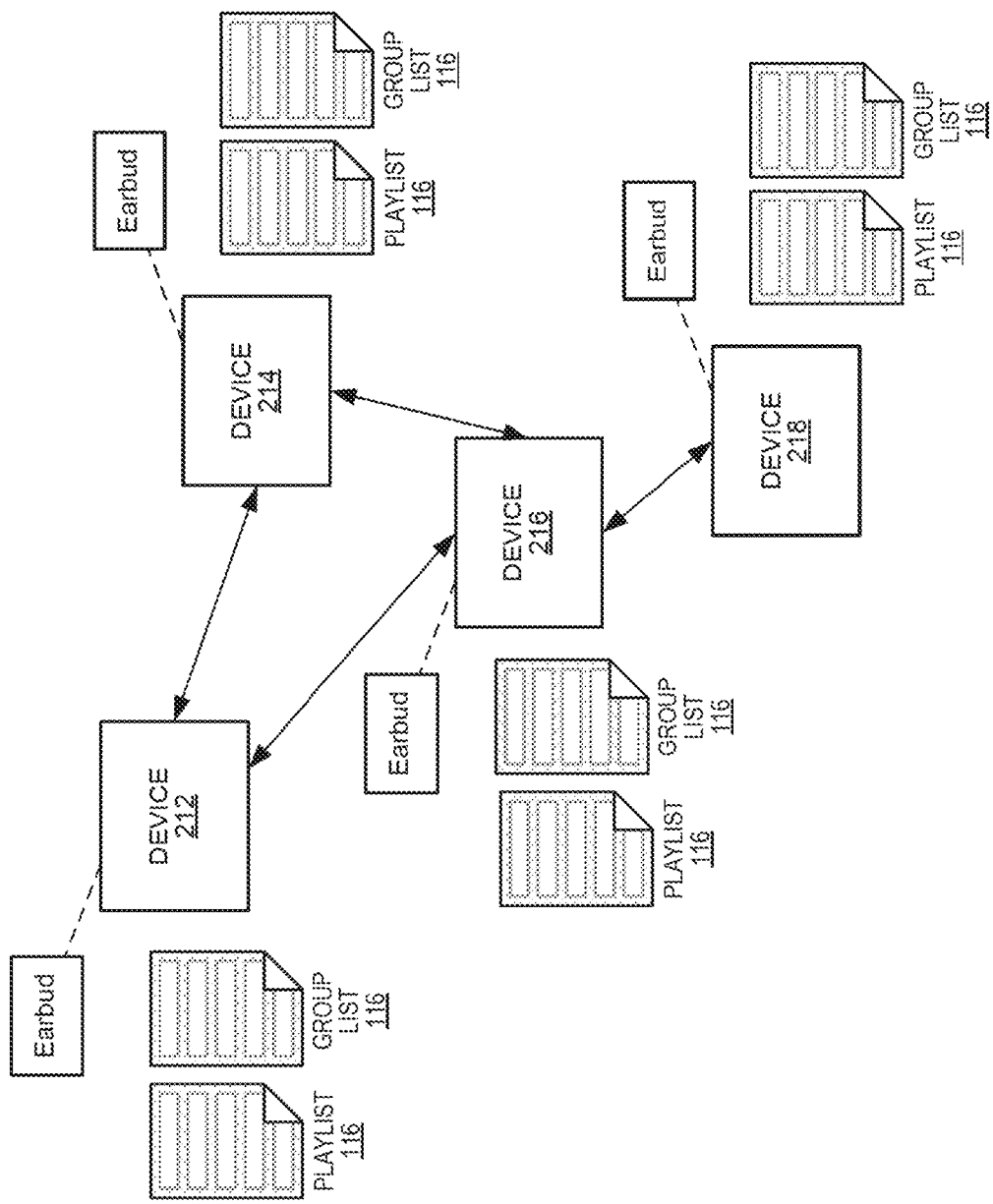
FIG. 2 is a block diagram of a peer-to-peer communications network according to an example embodiment of the present disclosure.

FIG. 2 illustrates a peer-to-peer communications network 200 according to an example embodiment. The network 200 may implement the methods described herein. The network 200 may include a plurality of devices 212, 214, 216, and 218. Collectively, the plurality of devices 212, 214, 216, and 218 engaged in peer-to-peer communications may be referred to as a "group." For the purposes of the present discussion, a "group" of devices simply refers to two or more devices that are actively engaged in peer-to-peer communication. In addition, the devices may be compliant with one or more wireless communication protocols, such as Bluetooth or WiFi protocols (e.g., IEEE 802.11a, 802.11b, 802.11g, 802.11n and 802.11ac). In some embodiments, the devices may also be adapted to support proprietary peer-to-peer protocols such as Apple® Wireless Direct Link (AWDL). Other similar protocols also may be adopted in order to facilitate peer-to-peer communications.

In the example communications network 200 illustrated in FIG. 2, a plurality of devices 212, 214, and 216 are connected, in an "ad-hoc" or "peer-to-peer" arrangement, e.g., via WiFi, and may be exchanging data in a full or partial mesh configuration. For example, device 212 may be connected to devices 214 and 216 through a series of peer-to-peer communication links (represented by the double arrows).

In an embodiment, a device may use a multi-hop technique, which may extend a range of the ad hoc network. For example, a first device 212 may be in communication with a second device 216, and the second device 216 may be in communication with a third device 218. The third device 218 may be out of range of the first device 212. However, a playlist would be synchronized for all three devices because the first device 212 and the third device 218 may be communicatively coupled via an intermediate device, i.e., the second device 216.

In an embodiment (not shown), multiple devices may be connected to and in communication with a master device but not with other devices in the group. For example, if device 212 is acting as the master device, devices 214 and 216 may be in communication with device 212, but not with each other.

However the devices of the group are connected, the master device will maintain and manage the group list and the playlist for the group. The group lists and the playlists for the other devices may be synchronized to the lists maintained by the master device.

In addition, the wireless devices 212, 214, 216, and 218 also may be connected to a respective accessory device (represented as "earbud") either directly or via a short-range communication link, such as Bluetooth® (represented by the dashed line). An accessory device may be a headset, speaker, earbud or similar peripheral device. The short-range wireless link may be a channel operable to transmit and receive several types of data, such as text, voice, multi-media streams, and the like. Bluetooth communication channels may be formed between a wireless device and an accessory device through a scanning and discovery process that establishes a connection between the two devices. Thus, a device may simultaneously maintain short-range communication links with an accessory device as well as peer-to-peer communication links with one or more group devices.

At least one member of the group may store a group list, 220.1, 220.2, 220.3, 220.4 that identifies each device 212, 214, 216, and 218 of the group. Several data entries in the group list 220 may be associated with each of listed group device. For example, the listing may include a device identifier, device address, associated accessory device identifier, capabilities or restrictions of the device, and communications requirements for each listed group device. A group list may include sufficient information such that a complete listing of the group may be obtained by sharing the group list between devices.

The neighbor lists may be populated in a variety of ways. For example, information about other devices may be obtained through a scanning and discovery process. In another example, the devices 212, 214, and 216 may exchange list information with each other when a group is formed. In yet another example, the neighbor lists may be generated through a sequential process. In an example sequential process, a neighbor list may be initially generated when two wireless devices form a group, and entries may be added or removed when a device joins or leaves the group. In this example, the initiating wireless device and the relevant device information may be listed first, and each subsequent group device may be listed thereafter in the order that it joins the group, or in some other order. In addition, the neighbor list may be updated when the communication requirements of one of the group devices increases or changes.

Each device may also store a group playlist 222 that is synchronized among the group devices. An updated playlist may be sent to each device of the group each time the playlist changes, or an update command may be sent to each device identifying the changes that should be made to the locally stored playlist.

As will be described below, the group lists and playlists may be used to generate a synchronization schedule that may be adopted by each of wireless devices 212, 214, 216, and 218, e.g., to synchronize playback on the devices. More specifically, each wireless device 212, 214, 216 and 218 may generate a playback schedule according to a predetermined algorithm or shared common protocol. At each device, the shared common protocol may be executed, using information contained within its playlist, to generate a synchronization schedule.

According to an embodiment, one or more of the devices 212, 214, 216, or 218, may be in communication with a media source such as described with reference to FIG. 1. Then each device connected to the media source can download the media resources required to complete the playlist playback. Any devices that are not connected to the media source, for example due to connection or data limitations, may receive the media resources from another source, such as a local storage or from one of the group devices.

The described embodiments may be adopted by portable, wireless, and/or stationary communication devices. Such devices include mobile phones, tablets, laptops, desktops, Internet-enabled televisions, wireless networking devices (e.g., a router), game terminals, speaker systems, and the like which may include one or more accessory devices, such as headsets, speakers, keyboards, or other input or output accessories.

Thus, a plurality of devices may communicate with one another in a peer-to-peer arrangement via one or more communication protocols, such as WiFi, and may communicate with wireless accessory devices via a short-range communication protocol. An example use of communication network 100 is a group of users listening to a music file or a sequence of music files using WiFi as the audio data transport, while a subset of those users are listening to the music using a Bluetooth® headset, speaker, or earbud.

Figure 3:
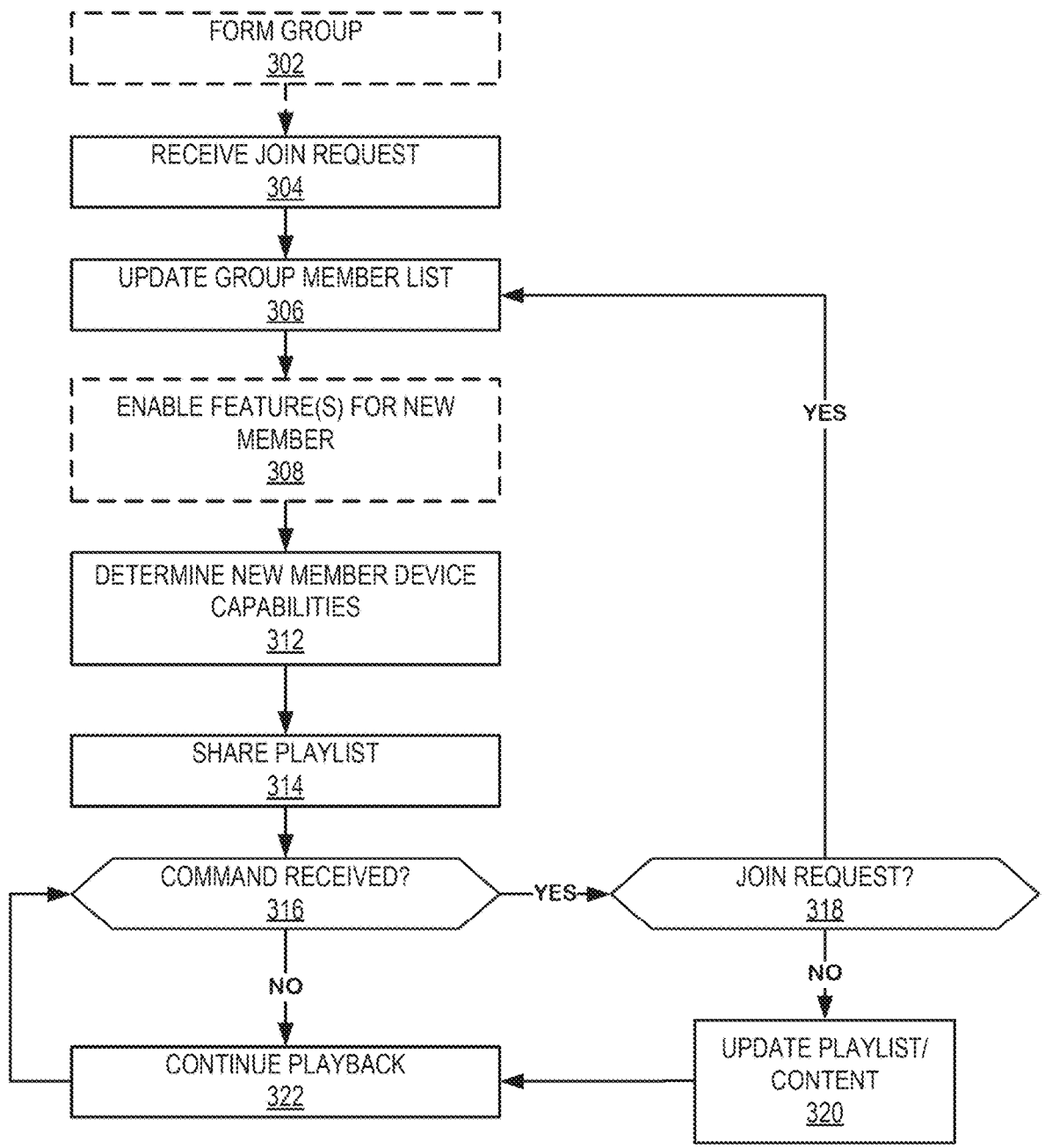
FIG. 3 illustrates an exemplary method 300 for sharing multimedia content according to embodiment of the present disclosure

FIG. 3 illustrates an exemplary method 300 for sharing multimedia content according to embodiment of the present disclosure. For each member of the group, multimedia may be shared with the group such that each group member perceives a same part of the multimedia at substantially the same time. Group members may modify the group playlist and such modifications will be propagated to the group in a real-time manner. Editing and/or control options for a group member may include pausing, rewinding, fast forwarding, skipping, adding, deleting, etc.

Preliminarily, a group may be formed for synchronized playback (block 302). When two or more individuals decide to share a playlist, a group will be formed. In an embodiment, the group initiator may be set as the master device. Or, in an embodiment, the group device with the best features, for example with the best network connection, or with the most processing capacity, may be set as the master device.

In an embodiment, a group may be identified by a unique identification (ID). The unique ID may facilitate entry into the group, such as when an invitation to the group includes a unique identifier, re-entry into the group such as when a group member exits and returns to the group, and may associate one or more playlists with the specific group.

In response to the formation of the group a group playlist may be initialized. The playlist may then be shared with members of the group, including those members who join the group subsequent to its formation. In an embodiment, the group playlist may include identifiers or pointers to one or more media resources such as the media resources stored at a media resource as shown in FIG. 1.

Once the group is created and the playlist initiated, synchronized playback of the playlist may be initiated and managed as described herein. In order to ensure that each group member has access to every track on the playlist, the master device may find a copy of each music track on the playlist, distribute a copy (or a pointer to a copy as appropriate) to each member device of the group, and transmit a start time to each group device. The copy may be stored in a networked or local media storage accessible by at least one device in the group, or may be stored on one or more of the group devices. If stored on a group device, the master device may receive a copy of the track, and any related permissions necessary to play the track, and propagate the track and related permissions to all other members of the group. If a group device has its own copy of the track, the local copy may be played rather than receiving a copy from the master device. If the track is stored on a network accessible media storage, a pointer to the stored track may be propagated and each device that can access the media storage may individually access the stored track.

Multiple copies of a track may be available to the group. For example, a copy of the requested track may be available from one or more group devices, from storage such as the cloud, or from a device that is connected to one of the group devices but is not a group device itself. For example, a smart phone group device may have access to tracks stored on a desktop. The best available copy of the track may be retrieved and distributed among the group devices for synchronized playback.

A group moderator or master device may receive a request from another device to join the group (block 304). The request may be received over a network that connects the master device and the requesting device. The request may be made from the device of a prospective group member (also referred to herein as an "invitee"). In an embodiment, an existing group member may invite an invitee to a group by sending a join request. For example, a user interface of a group member's device may list all contacts detectable by their device. Detectable devices may include devices that can be added to an ad-hoc network, such as devices within sufficient range to be in communication via a short-range communication protocol, devices connected to a local network, or devices connected to the Internet. According to an embodiment, an individual may discover accessible groups and request membership in the group. For example, a user interface of a group member's device may list all contacts that are detectable by their device and are part of a group, or the device may simply list detectible groups, such as groups in the vicinity or available over the Internet, that are accepting requests for admission to the group.

In an embodiment, a central server is not required to add an invitee so long as the invitee is within the group's ad hoc network. In an embodiment, the contacts listed as detectable may include all potentially discoverable contacts. For example, contacts may be located anywhere and need not be in proximity to a group member. As another example, contacts may be subscribers to a service.

In an embodiment, the invitee may activate a link in social media, e.g., a Website, an application, etc. The link may be an invitation to join a group. The activation of the link may trigger a request to join the group. The link and/or invitation may be shared, e.g., forwarded by a group member or non-group member to invitees.

In an embodiment, a group invitation link may be embedded with meta-data to indicate access privileges associated with the invitee. For instance, a subset of group members may be granted permission to exercise a set of functionalities. For example, some group members may be permitted to pause, skip, or add a song while others do not have such abilities. This may be reflected by deactivating or not displaying user interface elements associated with functionalities for which a group member does not have permission to activate. In some instances, a group may be a "private" group, permitting only pre-defined invitees to discover or join the group. In an embodiment, a receiving a request for an individual to join the group may include authentication procedures such as verifying an invitee's identity, payment or license information, access permissions (e.g., parental restrictions), and the like.

Upon receipt and verification of the join request, the master device may update a group list (block 306). The group list may identify all of the group, define the functionalities available for each group member, and any other information about the individual group members.

One or more features may be optionally enabled or disabled for a new member (block 308). By default, group members may manipulate a playlist by adding an audio file such as a song to a queue for playback, pause the playback, fast forward or rewind a song, reorder the playlist, etc. The manipulation of the playlist may be experienced by all of the other group members. For instance, pausing a playback will cause the media to be paused for all group members. In an embodiment, a group or subset of group members may be provided with read-only access of a playlist.

Group members may have access to, or be restricted from using, a number of playlist and group functionalities. For example, group members may have permission to add to or manipulate a playlist. According to an embodiment, some group members may have limited manipulation abilities, for example a group member may be permitted to add a song to a playlist but not to remove a song, or not to skip a song.

Group members may also have permission to participate in group messaging. For instance, members may begin or join a group discussion in a group specific chatroom or via a group text, such as SMS, MIMS, a messaging application, or the like. According to an embodiment, the chatroom or group text may persist after a participating member leaves the group. For example, if a member leaves the vicinity of the ad hoc network and can no longer participate in the shared playback of the group playlist, the user may still receive messages from the chatroom or group text associated with the group or playlist.

The persistence of the group messages may facilitate starting or re-starting a group. For example, one or more group members may leave the group, effectively taking a break from sharing in on the playback of the playlist. Then the member may rejoin the group with the aid of a group text or chat that identifies the group. According to an embodiment, the chat, text, message, or the like may persist after group playback is complete. For example, this may be useful to remind a group of what content has been played during a previous playback session.

When a new member joins the group, the capabilities and contents of a device being used by the new member (block 312) may be determined. For example, the device may be a smartphone, personal media player such as an MP3 player, a tablet, a computer, or the like. The features of the device may be used to determine whether the device has a "best" clock as further described herein. Or a copy of a track on the playlist may be identified on the device. In an embodiment, if the device has the highest quality version of the track, that version of the track may be transmitted to the master device and subsequently distributed to the other group members for playback. Alternatively, the new member may access the local copy rather streaming the track from another source when that track is being played by the group. In an embodiment, it may be determined whether the new member has digital rights to access or listen to the track. This may be used to determine whether the track may be distributed to all group members, as described herein.

The group playlist may then be shared with the new device (block 314), including one or more of the music files in the playlist. As previously noted, the playlist may be maintained by a master device and may include at least a part of one or more audio or media tracks. Each group device may receive instructions for playing the tracks and updates to the playlist from the master device. For instance, the playlist may be replicated to each member device. As further discussed herein, if there are multiple versions of a track, a "best" version may be selected and pushed to the member devices or each device may play a local copy of the track, if one exists.

In order to achieve the shared experience, when a member of a group accesses a permitted feature, the selected command will be transmitted to the master device. The master device will receive commands and process them (block 316). If the received command was a request to join the group (block 318), the master device will process the add request as described above (blocks 304-314).

A member may have access to an interface at his/her device that provides access to the playlist and/or the currently playing track. The actions and commands that the member performs on the device will be transmitted to group and implemented substantially simultaneously at each of the group devices. According to an embodiment, a display at the user device may provide information about the playlist manipulations, for example, by identifying the group member that added or skipped or paused a track.

If a received command is not a request to join (block 316), then the command may be a command to manipulate the playlist or playback of a track. For example, the command may be a command to modify the shared playlist or playback by adding a track to the playlist, pausing playback, fast or forward or rewind a track, or the like. Then the master device will implement the command by adjusting the playlist and push the updated playlist to all members of the group (block 320).

The master device may take into consideration a delay caused by transmitting the update to all the connected devices and set a delayed restart time for the playback if responding to the command includes skipping, pausing, or playing a track.

In an embodiment, access to a play command may be separated from access to a pause command in a user interface of the user's device, for example by using individual buttons for each commend, which may reduce the rate of accidental pause instructions. In an embodiment, a skip command may be associated with a track such that multiple skip commands for a particular track, which may be issued by different group members, are interpreted to be duplicates. Then a first skip command for a particular track a may be implemented while any subsequently received commands for the same track may be ignored.

In an embodiment, a scrubbing command such as a fast forward command or a rewind command may be implemented by scrubbing locally, identifying a destination point in the track, then sending that identified point to the master device for propagation to other members. This may prevent a mistake made by a member from being propagated to other members.

Once the command has been implemented and the shared playlist updated, playback may continue (block 322) until another command is received. According to an embodiment, a master device may manage conflicts. For example, if multiple commands are received at the master device, the master device may process them in order, based on a time stamp that identifies when the command was entered. The playlist may be displayed in a user interface of the master device and conflicting commands may be resolved by the user of the master device as needed.

To ensure that playback of a song is initiated and continues at substantially the same time for every member of the group, the master device will identify the slowest device and cause every group device to buffer playback data until a predetermined synchronous start time such that the predefined synchronous start time provides sufficient time for the slowest device to access and buffer at least a part of the track. The master device will set the predetermined start time based on a shared clock and an anchor time when the playback of the song should be initiated according to the embodiments described herein. If a device is beginning playback of a song that has already started playing for the rest of the group, an anchor time within the song may be set by the master device and the playback will begin at the anchor time of the song at a predetermined global time.

For example, an anchor point may be transmitted to each of the group devices where the anchor point is defined based on a known point in a track, such as at the beginning of the track, or at the 30 second mark, etc. Each device may begin playing the song from the anchor point at a synchronized time. The start time may be defined in relation to a buffer time, e.g., subsequent to a period of buffering by each group device. Buffering may be performed prior to beginning playback of the song to ensure that each device plays the same portion of the song at the same time. According to an embodiment, the anchor time and/or buffering may be adapted to detected network characteristics. For example, the amount of buffering may be determined by the member device with the lowest capabilities.

Figure 4:
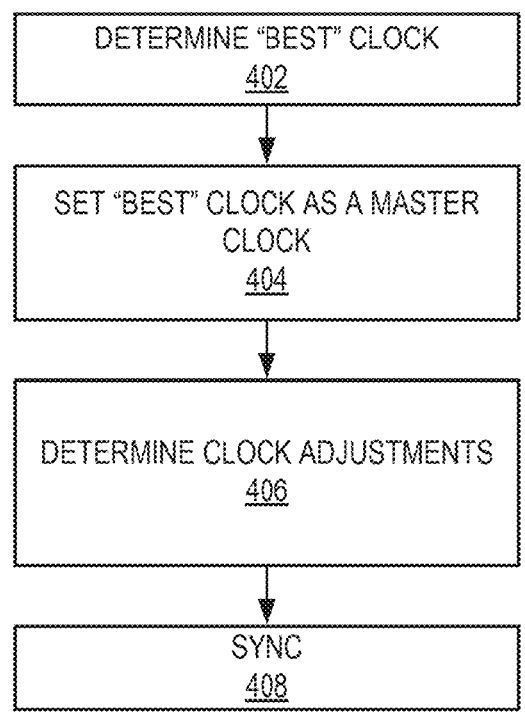
FIG. 4 illustrates an exemplary method 400 for synchronized multimedia sharing according to an embodiment of the present disclosure.

FIG. 4 illustrates an exemplary method 400 for synchronized multimedia sharing according to an embodiment of the present disclosure. As shown in FIG. 4, a synchronized clock is used among the devices of a group to playback media tracks in a substantially synchronized manner. Preliminarily a "best" clock from the available device clocks may be determined (box 402). Then once a clock is selected, as the best clock, the best clock may be set as the master clock for the group (box 404).

The best clock may be determined based on the hardware capabilities of each member device. In an embodiment, the clock with the most accurate time may be determined to be the "best" clock. In an embodiment, the best clock may be determined by comparing each clock and selecting the clock representing the most common time. In an embodiment, the accuracy of the clock may be determined by comparing the clock to a standard clock signal. In an embodiment, for example in a global sharing context such as sharing over the Internet, the master clock may be set to a standard reference time. For example, the master clock may be set to Greenwich Mean Time (GMT).

An adjustment to compensate for the difference between the master clock and the local clock of each device may be calculated to adjust the playback start time to conform to the master clock (box 406). In an embodiment, the playback may occur within a millisecond of the master clock. Any variations less than a millisecond may be imperceptible to the human ear.

Based on the adjusted start or restart times, the group devices may be synced (box 408). Syncing member devices may include preparing music samples for distribution and preparing commands or modifications of the streaming for distribution. For example, if a user pauses then restarts playback of a track, the restart can be transmitted as an instruction regarding playback for each of the group devices and each group device will adjust the local playback time based on the determined clock adjustment.

In an embodiment, syncing of the clocks of the group devices may be based on a network time protocol (NTP), the precision time protocol (PTP) for example as described in IEEE 1488, or 802.1AS synchronization protocols.

In an embodiment, when a master leaves a group, another group member may be made the master. For example, control of the playlist may be transferred to another group device and, if necessary, a new master clock may be defined.

In an embodiment, the group may not have a master but may rather synchronize control, manipulation, and playback of a playlist using a peer-to-peer network of the group devices to maintain and/or distribute the playlist. As discussed herein, devices may relay to one another discovery of an addition or a removal of a group member.

In an embodiment, if the only group member with digital rights to an audio file leaves the group, the group as a whole may lose rights to play the audio file and the audio file may be removed from the playlist.

In an embodiment, if a member with a copy of a track leaves the group, playback may still continue uninterrupted if a copy of the track was transmitted to a central server or another group device (such as the master device) as soon as the track is added to the playlist or some other time prior to the track owner leaving the group. In this situation, even if the member having the original copy of the audio file leaves the group, the audio file may be played so long as a member having digital rights to the audio file remains in the group if such rights are required.

According to an embodiment, if multiple members of the group split off from the remaining members of the group, the playlist and group settings may persist as two distinct groups that are synchronizing playback. Manipulations of the playlist may be performed separately for each group such that the playlist is synchronized only within the remaining members of the group.

As discussed herein, a group member may own or be licensed digital rights to an audio file for playback. A group member's digital rights may determine whether a song may be distributed to all group members. Whether a group member has a right to play or share the audio file may be indicated by the contents of the device. In an embodiment, if an audio file is properly encrypted and includes an appropriate distribution key, the audio file may be shared with other group members, e.g., added to a group playlist.

In an embodiment, if the group includes a minor or a member who is otherwise restricted from playing or accessing certain types of content (such as restricted tracks), those types of tracks may be banned from (e.g., removed from, skipped, or prevented from being added to) the playlist. If the playlist already includes restricted tracks, those tracks may be removed. In an alternative embodiment, an invitee who is a minor or otherwise cannot listen to at least some of the group content may be denied access to the group. In an embodiment, group members may be alerted and/or removed before the playing of an explicit track. In an embodiment, the group members inherit the restrictions associated with the master. This may ensure that appropriate or acceptable content is played for all group members. This may prevent users having different restrictions or permissions from joining a same group. In an embodiment, the group may inherit the lowest common permissions for the devices of the group.

In an embodiment, advertisements may be inserted into the playlist. The advertisements may be individually adapted to the group members. For example, each group member may listen to an advertisement tailored to that group member's interests. In an alternative embodiment, advertisements may be played for the entire group. Although played to the entire group, the advertisements may protect the privacy of individuals by not including targeted ads.

In an embodiment, playback permission for a track may be accessed from a member who has playback permissions and a secure key may be transmitted to each member in the group so that each member can share in the playback.

While the description here pertains to audio playback and control, the concepts described here apply as well to others aspects of synchronous multimedia playback and control. For example, a playlist may be shared within a vehicle. Each member device may have control over the playlist, while only one of the group devices is connected to a playing device such as an automobile speaker system.

As another example, the synchronous multimedia playback and control is implemented in a "party mode" such that a master device is connected to the sound system and other interruptions may be silenced. For instance, if the master device is a smartphone, music may continue to stream via the sound system while the master device is used as a telephone.

As yet another example, the methods and systems described herein may apply to HTTP Live Streaming (HLS) media or other media transmission protocols.

According to an embodiment, each participant may receive its own version of a media file based on bandwidth or other capabilities of the participant's device.

According to an embodiment, a group may consist of multiple individuals in different locations connected via the Internet or other network. In this context, being "in sync" may tolerate around 10 to 20 seconds of mismatch between devices.

According to an embodiment, if the group is large and widely distributed, playlist updates may be retrieved by the individual group devices (as a pull) rather than being pushed from a master device to each group device.

In another example, members may listen to audio tracks of different languages for a same movie. For instance, one member listens to a version of the audio in a first language while another member listens to a version of the audio in a different language while watching the same movie. In another example, members of a group may watch a synchronized video stream while video chatting.

Although the foregoing description includes several exemplary embodiments, it is understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular means, materials and embodiments, the disclosure is not intended to be limited to the particulars disclosed; rather the disclosure extends to all functionally equivalent structures, methods, and uses such as are within the scope of the appended claims.

Some embodiments may be implemented, using a non-transitory computer-readable storage medium or article which may store an instruction or a set of instructions that, if executed by a processor, may cause the processor to perform a method in accordance with the disclosed embodiments. The exemplary methods and computer program instructions may be embodied on a non-transitory machine-readable storage medium. In addition, a server or database server may include machine-readable media configured to store machine executable program instructions. The features of the embodiments of the present invention may be implemented in hardware, software, firmware, or a combination thereof and utilized in systems, subsystems, components or subcomponents thereof. The machine-readable storage media may include any medium that can store information. Examples of a machine-readable storage medium include electronic circuits, semiconductor memory device, ROM, flash memory, erasable ROM (EROM), floppy diskette, CD-ROM, optical disk, hard disk, fiber optic medium, or any electromagnetic or optical storage device.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

For example, operation of the disclosed embodiments has been described in the context of servers and terminals that implement video compression, coding, and decoding. These systems can be embodied in electronic devices or integrated circuits, such as application specific integrated circuits, field programmable gate arrays and/or digital signal processors. Alternatively, they can be embodied in computer programs that execute on personal computers, notebook computers, tablets, smartphones or computer servers. Such computer programs typically are stored in physical storage media such as electronic-, magnetic- and/or optically-based storage devices, where they may be read to a processor, under control of an operating system and executed. And, of course, these components may be provided as hybrid systems that distribute functionality across dedicated hardware components and programmed general-purpose processors, as desired.

In addition, in the foregoing Detailed Description, various features may be grouped or described together the purpose of streamlining the disclosure. This disclosure is not to be interpreted as reflecting an intention that all such features are required to provide an operable embodiment, nor that the claimed embodiments require more features than are expressly recited in each claim. Rather, as the following claims reflect, subject matter may be directed to less than all of the features of any of the disclosed embodiments. Thus, the following claims are incorporated into the Detailed Description, with each claim standing on its own as defining separately claimed subject matter.

Also, where certain claims recite methods, sequence of recitation of a particular method in a claim does not require that that sequence is essential to an operable claim. Rather, particular method elements or steps could be executed in different orders without departing from the scope or spirit of the invention.

While the invention has been described in detail above with reference to some embodiments, variations within the scope and spirit of the invention will be apparent to those of ordinary skill in the art. Thus, the invention should be considered as limited only by the scope of the appended claims.

What is claimed is:

1. A method for synchronizing a digital audio stream for member devices of a group, the method comprising, at a first one of the member devices that form the group:
   maintaining a member list of the member devices of the group, wherein the group comprises devices that join an ad hoc group;
   maintaining a queue of media content including at least one track for distribution to the member devices;
   receiving a command from another one of the member devices;
   updating the queue based on the command,
   distributing updates to the queue to other member devices;
   determining a master clock from amongst a plurality of clock sources available to the member devices; and
   synchronizing performance of the received command at each member device based on the updates, the master clock, and an anchor time of the at least one track relative to the master clock.

2. The method of claim 1, wherein:
   the command specifies synchronized performance of the at least one track;
   the anchor time indicates a time according to the master clock at which the synchronized performance of the at least one track should start.

3. The method of claim 1, wherein the anchor time correlates a known point of a track to a time of the master clock.

4. The method of claim 1, wherein the anchor time is computed by:
   determining a buffering capability of each member device of the group,
   estimating a playback time of a track according to a buffering capability of a least-capable device that is a member of a group, and
   setting the anchor time by correlating the estimated playback time to the master clock.

5. The method of claim 1, wherein, when a media device joins a group that is already playing a track at a time the device joins, the anchor time is computed by:
   estimating a future shared global time at which a point of track playback will occur, setting the anchor time to the estimated future shared global time.

6. The method of claim 1, further comprising, when a first master device leaves the group:
   selecting a new master device for the group, and
   selecting a new master clock source by repeating the determining the master clock operation,
   determining a new anchor time according to the new master clock source, and
   transmitting the new anchor time to other member devices of the group.

7. The method of claim 1, wherein the member devices form a peer-to-peer network.

8. The method of claim 1, wherein the determining comprises:
   determining an accuracy of a respective clock source of each of the member devices;
   comparing the accuracy of each of the clock sources to determine the most accurate clock;
   setting the most accurate clock as a shared master clock for measuring a shared global time; and adjusting playback of a track to be consistent with the master clock for each member device other than the member device associated with the master clock.

9. The method of claim 1, further comprising:
scheduling an anchor time with respect to a shared master clock to begin playback of a track; and
distributing the anchor time to each of the member devices.

10. The method of claim 9, further comprising:
determining a buffer size prior to the anchor time, wherein the buffer size is defined by a slowest one of the member devices such that the slowest member device is capable of playing the digital audio stream in synchrony with the other member devices;
determining the anchor time based on the buffer size.

11. The method of claim 1, further comprising:
receiving a request for an invitee device to join the group;
updating the member list to include the invitee device; and
distributing a copy of the queue and at least a portion of a current track to the invitee device.

12. The method of claim 11, further comprising:
authenticating the invitee device; and
wherein updating the member list is performed if the invitee device is authenticated.

13. The method of claim 1, further comprising:
determining whether at least one of the member devices contains digital rights to a track on the queue; and
if none of the member devices contains digital rights to the track, removing the track from the queue and proceeding to a next track on the queue.

14. The method of claim 1, further comprising:
determining whether at least one of the member devices is restricted from receiving a type of track on the queue; and
if at least one of the member devices is restricted, removing the member device from the group prior to distributing a portion of the type of track.

15. The method of claim 1, further comprising:
determining whether at least one of the member devices is restricted from receiving a type of track on the queue; and
if at least one of the member devices is restricted, removing all tracks of the type of track from the queue.

16. The method of claim 1, further comprising:
if the command is a scrubbing instruction, identifying a point corresponding to the scrubbing of the track on the first one of the member devices; and
sending the point of the track as an anchor time with respect to the master clock to the other member devices.

17. The method of claim 1, wherein the first one of the member devices is configured to display a user interface to resolve a conflict between a plurality of received commands.

18. The method of claim 17, further comprising:
if the first one of the member devices departs the group, configuring another one of the member devices to perform functions of the first one of the member devices.

19. A non-transitory computer-readable medium storing program instructions that, when executed, cause a processor to perform a method, the method comprising, at a first one of member devices that form a group:
maintaining a member list of the member devices of the group, wherein the group comprises devices that join an ad hoc group;
maintaining a queue of media content including at least one track for distribution to the member devices;
receiving a command from another one of the member devices;
updating the queue based on the command,
determining a master clock from amongst a plurality of clock sources available to the member devices; and
distributing updates to the queue and an anchor time of the at least one track to other member devices such that the received command is performed substantially simultaneously at each member device and based on the master clock, wherein the anchor time is relative to the master clock.

20. A device comprising:
a memory device to store a member list identifying another connected device as a member of a group and a queue identifying at least one track for synchronized playback among devices, wherein the group comprises the devices that join an ad hoc group, and
a processor configured, according to a role of the device when the device has the role of a master device, to cause the device to:
receive a command to manipulate the queue of media content from a non-master device;
update the queue based on the command;
distribute updates to the queue to the other connected device;
determining a master clock from amongst a plurality of clocks available to the devices; and
synchronize a performance of the received command at each device with the most accurate clock wherein the adjusting playback is based on an anchor time of the track relative to a shared global time of the master clock.

21. The device of claim 20, wherein the master device is further configured to:
determine an accuracy of a respective clock of each connected device;
compare the accuracy of each of the clocks to determine the most accurate clock; and
set the most accurate clock as a master clock.

22. The device of claim 21, wherein each connected device is configured to adjust playback of a track to be consistent with the master clock, and wherein to adjust playback, the master device schedules an anchor time to begin playback of a track and distributes the anchor time to each connected device.

23. A method for synchronizing a digital audio stream for member devices of a group, the method comprising, at a first one of the member devices that form the group:
maintaining a member list of the member devices of the group, wherein the group comprises devices that join on the basis of requests among the devices;
maintaining a queue of media content including at least one track for distribution to the member devices;
receiving a command from another one of the member devices;
updating the queue based on the command,
determining a master clock from amongst a plurality of clock sources available to the member devices; and
distributing updates to the queue to other member devices; and
synchronizing performance of the received command at each member device based on the updates, the master clock, and an anchor time of the at least one track relative to a shared global time of the master clock.

* * * * *